US012626970B2

(12) United States Patent (10) Patent No.: US 12,626,970 B2
Jeon (45) Date of Patent: May 12, 2026

(54) BATTERY DEVICE

(71) Applicant: SK On Co., Ltd., Seoul (KR)

(72) Inventor: Hae Ryong Jeon, Daejeon (KR)

(73) Assignee: SK On Co., Ltd., Seoul (KR)

( * ) Notice: Subject to any disclaimer, the term of this patent is extended or adjusted under 35 U.S.C. 154(b) by 627 days.

(21) Appl. No.: 18/088,389

(22) Filed: Dec. 23, 2022

(65) Prior Publication Data

US 2023/0216107 A1 Jul. 6, 2023

(30) Foreign Application Priority Data

Jan. 5, 2022 (KR) ........................ 10-2022-0001614

(51) Int. Cl.
*H01M 10/6566* (2014.01)
*H01M 10/613* (2014.01)
*H01M 50/204* (2021.01)
*H01M 50/262* (2021.01)
*H01M 50/289* (2021.01)

(52) U.S. Cl.
CPC ..... *H01M 10/6566* (2015.04); *H01M 10/613* (2015.04); *H01M 50/204* (2021.01); *H01M 50/262* (2021.01); *H01M 50/289* (2021.01)

(58) Field of Classification Search
CPC ........... H01M 10/613; H01M 10/6566; H01M 50/204
See application file for complete search history.

(56) References Cited

U.S. PATENT DOCUMENTS

| | | | | |
|---|---|---|---|---|
| 11,283,121 | B1 * | 3/2022 | Boecker | .............. H01M 50/249 |
| 2010/0273034 | A1 * | 10/2010 | Hermann | ................ B60L 50/64 |
| | | | | 429/62 |
| 2012/0164490 | A1 | 6/2012 | Itoi et al. | |
| 2014/0234687 | A1 | 8/2014 | Fuhr et al. | |
| 2019/0229384 | A1 * | 7/2019 | Tasiopoulos | ...... H01M 10/6554 |
| 2019/0312322 | A1 | 10/2019 | Ahn et al. | |
| 2020/0152941 | A1 | 5/2020 | Wynn et al. | |
| 2022/0077539 | A1 | 3/2022 | Ren et al. | |
| 2023/0318086 | A1 * | 10/2023 | Kim | .................... H01M 10/613 |
| | | | | 429/120 |
| 2023/0361417 | A1 | 11/2023 | Chun et al. | |

FOREIGN PATENT DOCUMENTS

| | | | | |
|---|---|---|---|---|
| CN | 207217633 | U | * | 4/2018 |
| CN | 111384328 | A | | 7/2020 |
| CN | 213782096 | U | * | 7/2021 |
| JP | 5466906 | B2 | | 4/2014 |

(Continued)

OTHER PUBLICATIONS

Machine Translation of JP2021048113A. (Year: 2021).*

(Continued)

*Primary Examiner* — Jonathan G Jelsma

(74) *Attorney, Agent, or Firm* — IP & T GROUP LLP

(57) ABSTRACT

A battery device includes a cell stack in which a plurality of battery cells are stacked, a first plate having a gas inlet and having a first surface on which the cell stack is disposed, at least one cooling flow path disposed on a second surface of the first plate, and at least one venting flow path disposed on the second surface of the first plate and formed in a space between the cooling flow paths to be connected to the gas inlet.

11 Claims, 15 Drawing Sheets

(56) References Cited

FOREIGN PATENT DOCUMENTS

| JP | 2021048113 A | * | 3/2021 |
|----|--------------|---|--------|
| KR | 10-2018-0083140 A | | 7/2018 |
| KR | 10-2021-0127320 A | | 10/2021 |

OTHER PUBLICATIONS

Extended European search report for the European Patent Application No. 22217290.0 issued by the European Patent Office on May 25, 2023.
Office Action for Korean Patent Application No. 10-2022-0001614 issued by the Korean Patent Office on Oct. 10, 2025.

* cited by examiner

III-III'

III-III'

IV-IV'

V–V'

VI–VI'

VII–VII'

BATTERY DEVICE

CROSS-REFERENCE TO RELATED APPLICATION(S)

This application claims benefit of priority to Korean Patent Application No. 10-2022-0001614 filed on Jan. 5, 2022 in the Korean Intellectual Property Office, the disclosure of which is incorporated herein by reference in its entirety.

BACKGROUND

1. Field

The present disclosure relates to a battery device having improved safety.

2. Description of Related Art

Unlike primary batteries, secondary batteries are chargeable and dischargeable, and thus are applicable to devices within various fields such as digital cameras, mobile phones, notebook computers, hybrid vehicles, and electric vehicles. Among secondary batteries, a large amount of research has been conducted on lithium secondary batteries having high energy density and discharge voltage. Lithium secondary batteries have been manufactured as pouch-type battery cells having flexibility, prismatic battery cells having rigidity, or cylindrical can-type battery cells.

A plurality of battery cells stacked and electrically connected to each other are mounted in a packing case in units of cell stacks to form a battery pack. Such a battery pack is installed and used in an electric vehicle or the like.

It is very important to ensure safety of such a battery device. In particular, when gas is generated in a battery cell due to an abnormal phenomenon and the gas is not rapidly discharged, other adjacent battery cells may be continuously exposed to high-temperature gas, which may lead to ignition or explosion. Therefore, it is necessary to rapidly discharge the internally generated gas externally.

Chinese Patent Application No. 2018-11642595 discloses a technology for discharging gas through a lower portion of a case of a battery device. However, in a structure disclosed in the above document, only gas is dischargeable, and cooling of a battery cell or gas is not considered at all. Accordingly, there is an issue in that heat of the battery cell or heat of the gas is concentrated on the inside of the battery device, thereby causing additional explosion or ignition.

Related Art 1: Chinese Patent Application No. 2018-11642595

SUMMARY

An aspect of the present disclosure is to suppress the occurrence of ignition or explosion by rapidly discharging high-temperature gas generated in a battery pack while cooling the high-temperature gas.

According to an aspect of the present disclosure, there is provided a battery device including a cell stack in which a plurality of battery cells are stacked, a first plate having a gas inlet and having a first surface on which the cell stack is disposed, at least one cooling flow path disposed on a second surface of the first plate, and at least one venting flow path disposed on the second surface of the first plate and formed in a space between the cooling flow paths to be connected to the gas inlet.

The battery device may further include a second plate spaced apart from the first plate by a predetermined distance. The cooling flow path and the venting flow path may be formed between the first plate and the second plate.

The cooling flow path may be formed integrally with the first plate and the second plate.

The cooling flow path may be formed integrally with the first plate. A space formed between the cooling flow path and the second plate may be used as the venting flow path.

The battery device may further include a sidewall portion surrounding a side surface of the cell stack and fastened to the first plate. An expanded flow path connected to the venting flow path may be provided in the sidewall portion.

The battery device may further include a gas outlet fastened to the sidewall portion and connected to the expanded flow path.

The battery device may further include a reinforcing member coupled to a portion of the sidewall portion opposing the cell stack. The reinforcing member may be formed of a material having a melting point higher than that of the sidewall portion.

The cooling flow path may include a first flow path formed integrally with the first plate and the second plate, and a second flow path formed integrally with the first plate, the second flow path having at least one portion spaced apart from the second plate by a predetermined distance.

The first flow path may be a flow path formed to have a meandering shape. The second flow path may be a flow path connecting the first flow path and a gas outlet to each other.

The second flow path may be a flow path disposed on an outermost side of the cooling flow path.

A plurality of first flow paths may be dispersedly disposed. The second flow path may be branched into a plural its of second flow paths, and the plurality of second flow paths may be connected to the plurality of first flow paths, respectively.

The venting flow path may be divided into a first venting flow path and a second venting flow path by the cooling flow path.

The battery device may include a first gas outlet connected to the first venting flow path, and a second gas outlet connected to the second venting flow path.

The battery device may further include a sidewall portion surrounding a side surface of the cell stack and fastened to the first plate. The first venting flow path and the second venting flow path may be connected to each other through an expanded flow path formed in the sidewall portion.

The cell stack may include at least one terminal. The gas inlet may be formed in a region of the first plate positioned below the terminal.

A cross-section of each of the cooling flow path and the venting flow path may be formed to have a triangular shape. The cooling flow path may have one triangular side formed by the cooling flow path, and the venting flow path has one triangular side formed by the second late.

According to example embodiments of the present disclosure, a cooling flow path and a venting flow path may be formed together between a first plate and a second plate, such that an inner space of a battery device may be efficiently used, thereby increasing energy density of the battery device, and cooling high-temperature gas flowing in the venting flow path through the cooling flow path.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
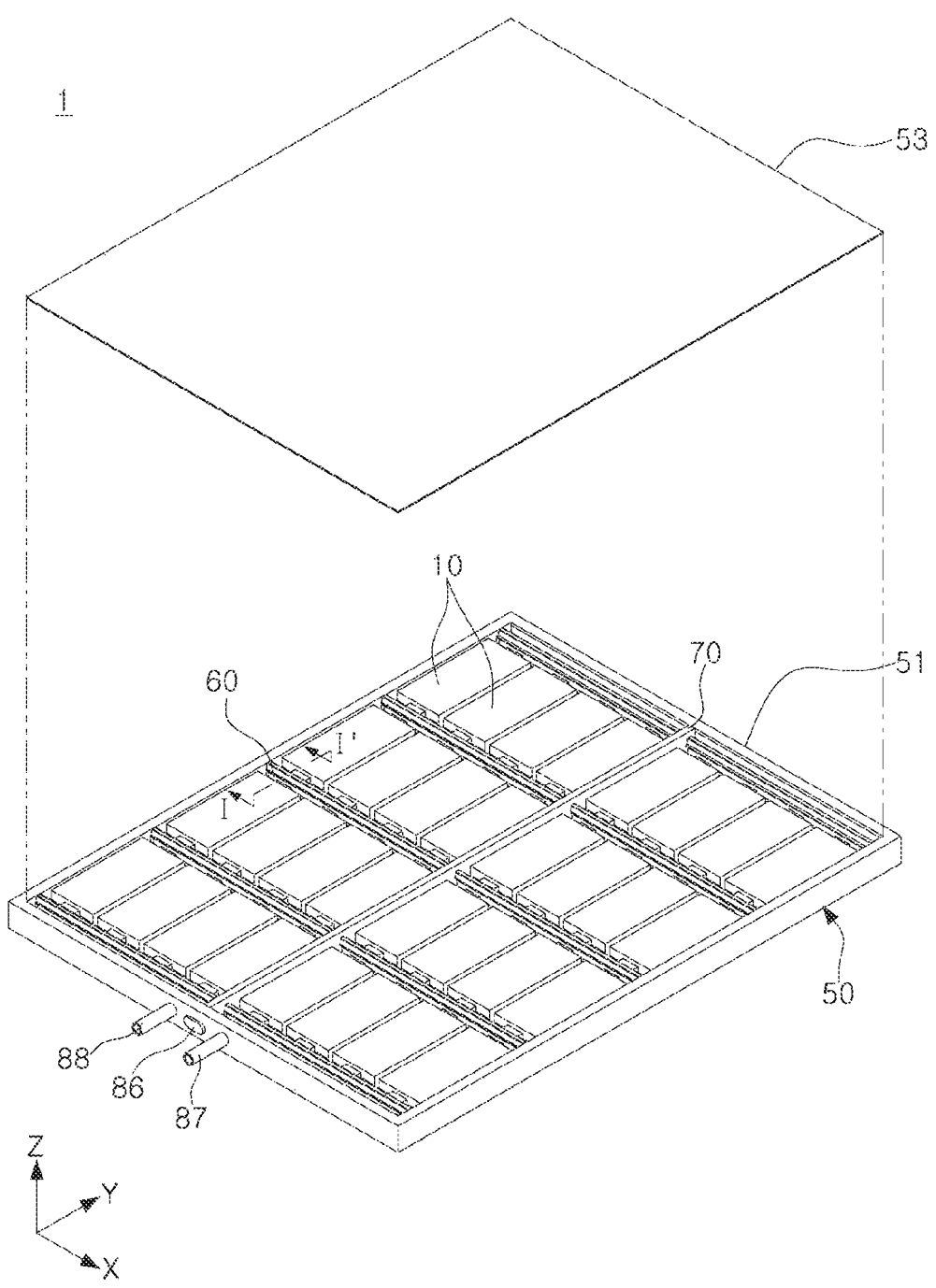
FIG. 1 is a schematic perspective view illustrating a battery pack according to an example embodiment of the present disclosure.

Preferred example embodiments of the present disclosure are described hereinafter in detail with reference to the accompanying drawings. Before describing the example embodiments, the words and terminologies used in the specification and claims should not be construed with common or dictionary meanings, but construed as meanings and conception coinciding the spirit of the invention under a principle that the inventor (s) can appropriately define the conception of the terminologies to explain the invention in the optimum method. Therefore, example embodiments described in the specification and the configurations illustrated in the drawings are not more than the most preferred example embodiments of the present disclosure and do not fully cover the spirit of the present disclosure. Accordingly, it should be understood that there may be various equivalents and modifications that can replace those when the present application is filed.

Hereinafter, preferred example embodiments of the present disclosure will be described in detail with reference to the accompanying drawings. In this case, it should be rioted that the same components are denoted by the same reference numerals in the accompanying drawings. In addition, detailed descriptions of well-known functions and configurations that may obscure the gist of the present disclosure will be omitted. For the same reason, some components are exaggerated, omitted, or schematically illustrated in the accompanying drawings, and the size of each component does not fully reflect the actual size.

For example, in the present specification, an upper side, an upper portion, a lower side, a lower portion, and the like are described with reference to the drawings, and may be described differently when the direction of a corresponding object is changed.

In addition, a battery device described below may include an EV system, an energy storage system, and the like including a battery module or battery pack including a plurality of battery cells. In the following example embodiments, the battery pack will be described as an example.

Figure 2:
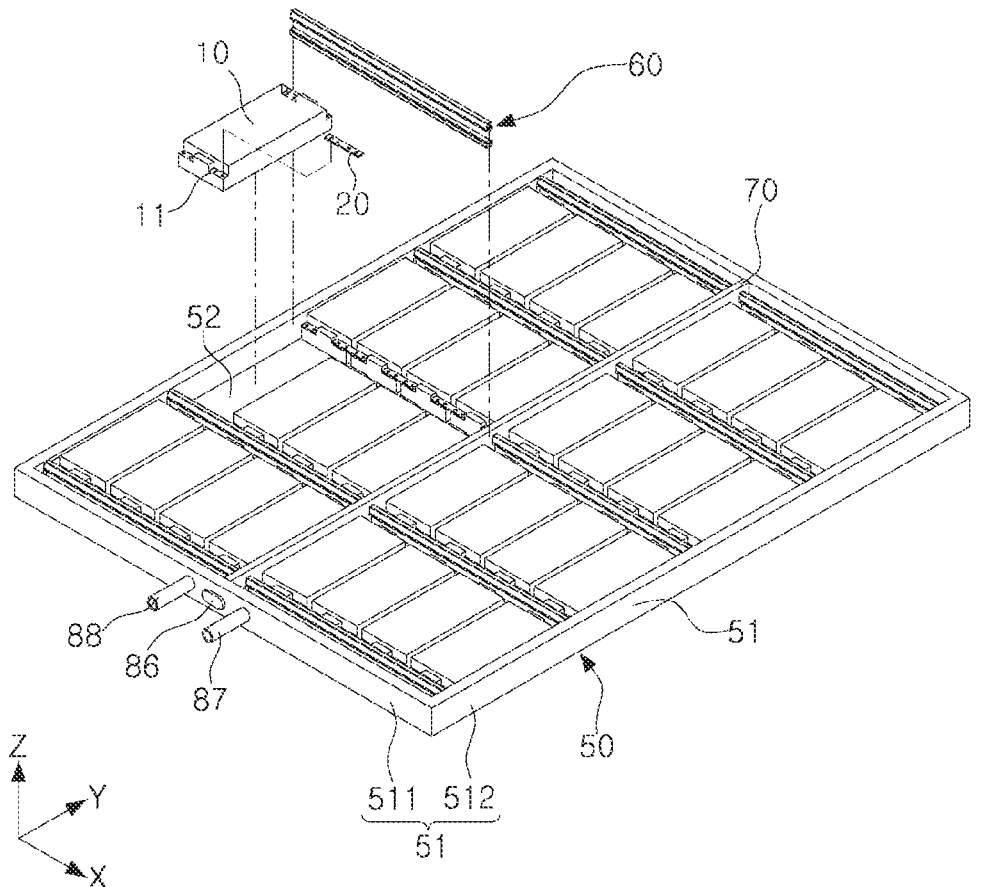
FIG. 2 is a partially exploded perspective view of FIG. 1.

FIG. 1 is a schematic perspective view illustrating a battery pack according to an example embodiment of the present disclosure. FIG. 2 is a partially exploded perspective view of FIG. 1. For ease of description, an upper plate is omitted in FIG. 2.

Referring to FIGS. 1 and 2, a battery pack 1 according to an example embodiment of the present disclosure may include a plurality of cell stacks 10 and a packing case 50.

The cell stack 10 may include a secondary battery such as a lithium battery or a nickel-hydrogen battery capable of being charged and discharged. Each cell stack 10 may be formed to have a hexahedral shape by stacking a plurality of battery cells, and the stacked battery cells may be accommodated in a case, or a state in which the battery cells are stacked may be fixed by a fastening member such as a frame.

At least one terminal 11 may be provided on a side surface of the cell stack 10. The terminal 11 may be a conductive member disposed to be exposed to the outside of the cell stack 10 to electrically connect the battery cells externally.

In the present example embodiment, the terminal 11 may be disposed on at least one of opposite end portions of the cell stack 10 in a longitudinal direction. The terminal 11 may include a positive electrode terminal and a negative electrode terminal. Both the positive electrode terminal and the negative electrode terminal may be disposed at one end of the cell stack 10 or may be dispersedly disposed at opposite ends of the cell stack 10, respectively.

When a terminal is not provided in the cell stack 10, in the present example embodiment, the terminal may refer to a terminal electrode provided in each battery cell.

A connection member 20 may be fastened to the terminal 11.

The connection member 20 may connect one cell sack 10 and the terminal 11 of another adjacent cell stack 10 to each other.

The connection member 20 may include a bus bar or a cable. The connection member 20 may be fastened to the terminal 11 of the cell stack 10 having different ends through a fastening member such as a bolt.

The cell stacks 10 according to the present example embodiment may be connected to each other in series or in parallel through the connection member 20. In addition, some of the cell stacks 10 may be connected in series, and others of the cell stacks 10 may be connected in parallel, as necessary.

The connection member 20 according to the present example embodiment may be formed by processing a flat rod-shaped conductive member. In addition, the connection member 20 may be formed of a material having flexibility. However, the present disclosure is not limited thereto.

The packing case 50 may provide an accommodation space for accommodating, other components therein. Accordingly, the packing case 50 may be provided in a form of surrounding the entire cell stacks 10, and the plurality of cell stacks 10 may form a plurality of rows in the accommodation space of the packing case 50, and may be disposed in parallel.

The packing case 50 may be formed of a metal material to secure rigidity, but the present disclosure is not limited thereto. In addition, in order to enhance a heat dissipation effect, at least one portion of the packing case 50 may be formed of aluminum.

The packing case 50 may include a sidewall portion 51 forming an inner space, a lower plate 52 covering a lower portion of the inner space, and an upper plate 53 covering an upper port on of the inner space.

At least one of the lower plate 52 and the upper plate 53 may function as a cooling member for cooling the cell stack 10. In the present example embodiment, the lower plate 52 may function as a cooling member. When the lower plate 52 functions as a cooling member, lower surfaces of a plurality of battery cells included in the cell stack 10 may be in direct contact with the lower plate 52. In addition, a heat conduction medium may be inserted between the battery cell and the lower plate 52 to dissipate heat, thereby enhancing cooling efficiency. However, the present disclosure is not limited thereto. The upper plate 53 may also be formed to have a shape the same as or similar to that of the lower plate 52 to be described below, as necessary, to function as a cooling member.

The sidewall portion 51 may form an outer surface of the packing case 50 and define an inner space. Accordingly, the cell stacks 10 may be accommodated in the inner space defined by the sidewall portion 51 to be mounted on the lower plate 52.

In the present example embodiment, the sidewall portion 51 may include at least one first sidewall 511 on which a gas outlet 86 to be described below is disposed, and at least one second sidewall 512 on which the gas outlet 86 is not disposed. Here, the at least one first sidewall 511 and the at least one second sidewall 512 may be disposed to be orthogonal to each other.

The sidewall portion 511 may be formed of a metal material having a predetermined level of rigidity or higher. For example, in order to enhance the heat dissipation effect, at least one portion of the sidewall portion 51 may be formed of aluminum.

Figure 4:
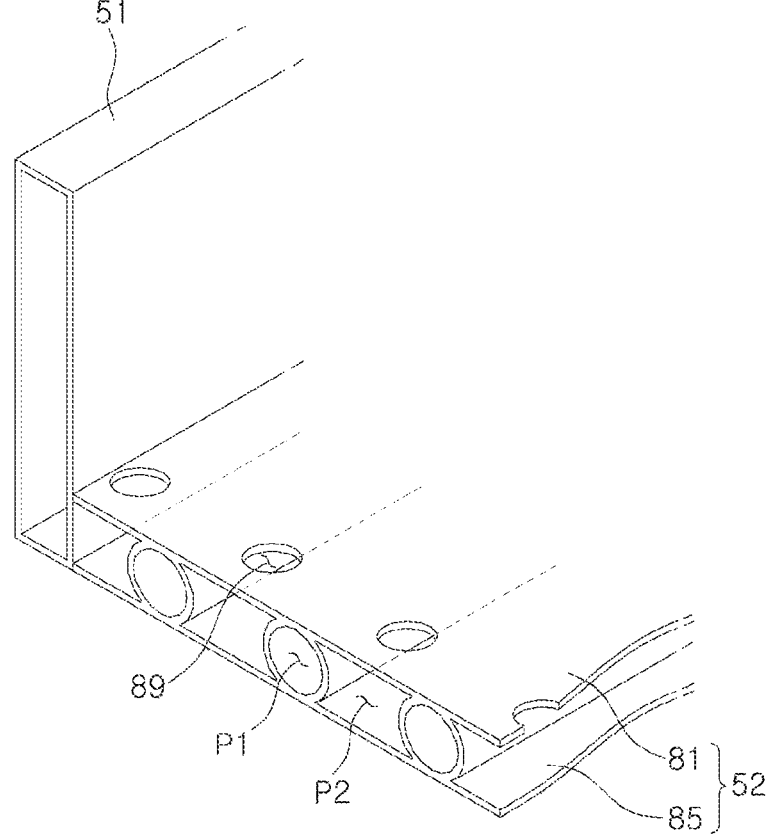
FIG. 4 is a perspective view illustrating a cross-section taken along line I-I' of FIG. 3.

The sidewall portion 51 may extend along a side surface of the lower plate 52. For example, as illustrated in FIG. 4, at least one portion of the sidewall portion 51 may be disposed to oppose the side surface of the lower plate 52, and thus may be coupled to the side surface of the lower plate 52.

The sidewall portion 51 may be coupled to the lower plate 52 in various manners. For example, the sidewall portion 51 may be joined to the lower plate 52 through welding. In this case, the sidewall portion 51 and the lower plate 52 may be formed of the same mater al in order to secure sufficient welding bonding strength. However, the present disclosure is not limited thereto. The sidewall portion 51 and the lower plate 52 may be formed of different materials, as necessary.

In addition, the sidewall portion 51 may be fastened to lower plate 52 through a fastening member such as a bolt.

The battery pack 1 according to the present example embodiment may include partition wall members 60 and 70 to partition an inner space formed by the sidewall portion 51.

The partition wall members 60 and 70 may be disposed to cross the inner space formed by the sidewall portion 51 to part on the inner space into plurality of accommodation spaces. Accordingly, at least one portion of the partition wall members 60 and 70 may be fastened to the sidewall portion 51.

As the partition wall members 60 and 70 are provided, the overall rigidity of the packing case 50 may be reinforced. In addition, the partition wall members 60 and 70 may be disposed between the cell stacks 10 to suppress propagation of gases or flames between the cell stacks 10. Specifically, the partition wall members 60 and 70 may be disposed to cross between the two cell stacks 10 disposed to oppose each other. Accordingly, the cell stacks 10 may be dispersedly disposed in a plurality of accommodation spaces partitioned by the sidewall portion 51 and the partition wall members 60 and 70, respectively.

The partition wall members 60 and 70 according to the present example embodiment may include at least one first partition wall member 70 disposed in parallel with a longitudinal direction of the cell stacks 10, and at least one second partition wall member 60 disposed in parallel with a width direction of the cell stacks 10.

The partition wall members 60 and 70 may be formed of a metal material having a predetermined level of rigidity or higher. In addition, in order to enhance the heat dissipation effect, at least one portion of the partition wall members 60 and 70 may be formed of aluminum.

The lower plate 52 may be disposed below the cell stack 10 to support a lower surface of the cell stack 10. In the present example embodiment, the lower plate 52 may be formed to have a rectangular shape. However, the lower plate 52 may be formed to have a circular shape or other polygonal shapes, as necessary.

Figure 3:
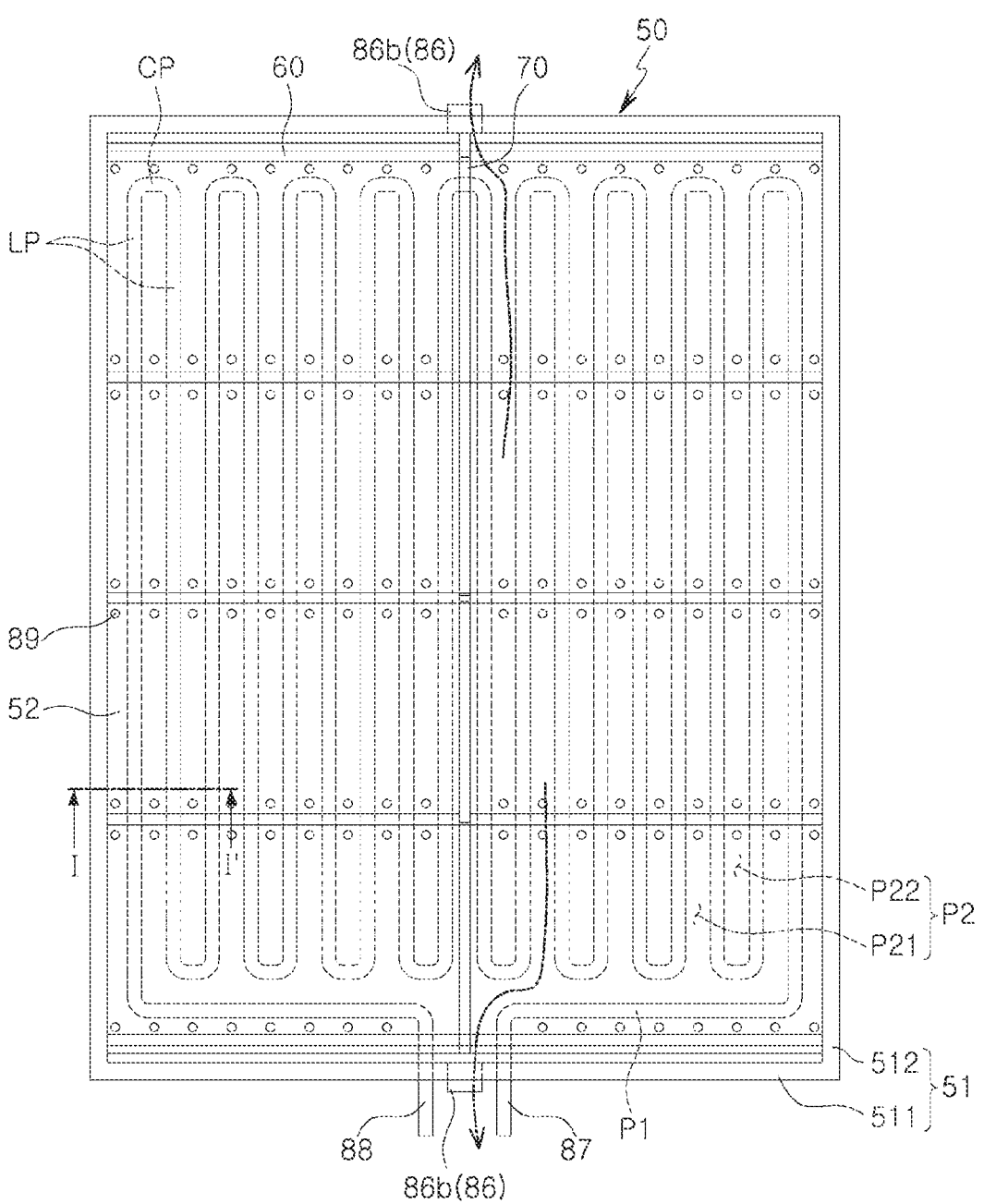
FIG. 3 is a plan view of the packing case illustrated in FIG. 2.

FIG. 3 is a plan view of the packing case illustrated in FIG. 2, and FIG. 4 is a perspective view illustrating a cross-section taken along line II' of FIG. 3. For ease of understanding, in FIG. 3, a cooling flow path is indicated by a dotted line. In addition, arrows in FIG. 3 indicate the flow of gas introduced into a venting flow path.

Referring to FIGS. 3 and 4 together, the lower plate 52 may include a first plate 81 and a second plate 85 disposed on an outer side of the first plate 81.

The first plate 81 may support the cell stack 10. The first plate 81 has a gas inlet 89 and has a first surface on which the cell stack 10 is disposed. At least one cooling flow path P1 may be disposed on a second surface of the first plate 81, and at least one venting flow path P2 may be disposed on the second surface of the first plate 81. And at least one venting low path P2 may be formed in a space between the cooling flow paths P1 to be connected to the gas inlet 95. Accordingly, at least one portion of the first plate 81 may be in contact with the lower surface of the cell stack 10.

The first plate 81 may be formed of a metal material having a predetermined level of rigidity or higher. For example, at least one portion of the first plate 81 may include aluminum. When the first plate 81 includes aluminum, it can be expected that heat energy generated in the cell stack 10 is rapidly dissipated to the outside of the battery pack 1 due to excellent heat conductivity of aluminum.

The second plate 85, a member disposed on the outside of the first plate 81, may be disposed in a position spaced apart from that of the first plate 81 by a predetermined distance, and may be formed to have a size similar co or the same as that of the first plate 81.

The second plate 85 may be formed of a material the same as that of the first plate 81, but the present disclosure is not limited thereto. The second plate 85 may be fastened to at least one of the first plate 81 and the sidewall portion 51.

The first plate 81 and the second plate 85 may be spaced apart from each other in parallel, and a flow path space may be formed between the first plate 81 and the second plate 85.

A cooling flow path P1 and a venting flow path P2 may be formed in the flow path space.

The cooling flow path 81 for the flow of a refrigerant may be formed as a space in which the refrigerant introduced from a refrigerant inlet 87 flows. Heat generated in the cell stack 10 may be continuously absorbed by the refrigerant due to the flow of the refrigerant.

The cooling flow path 81 may be connected to the refrigerant inlet 87 and a refrigerant outlet 88. Accordingly, the refrigerant may be introduced into the cooling flow path P1 through the refrigerant inlet 87, may flow along the cooling flow path P1, and then may be discharged externally through the refrigerant outlet 88.

The refrigerant inlet 87 and the refrigerant outlet 88 may be disposed to pass through the sidewall portion 51, but the present disclosure is not limited thereto. For example, when at least one portion of the lower plate 52 is disposed to protrude to the outside of the sidewall portion 51, the refrigerant inlet 87 and the refrigerant outlet 88 may be disposed on the first plate 81 on the outside of the sidewall portion 51.

In the present example embodiment, the cooling flow path P1 may be dispersedly disposed throughout the first plate 81 to cool the first plate 81. To this end, the cooling flow path 81 may include a plurality of linear flow paths LP spaced apart from each other and disposed in parallel, and a curved flow path CP connecting the linear flow paths LP to each other. However, the present disclosure is not limited thereto, and the entire cooling flow path P1 may be formed only as the linear flow path LP or only as the curved flow path CP.

The curved flow path CP described in the present example embodiment is not limited to the curved flow path CP has a curved shape, and may comprehensively include a section of the entire cooling flow path P1 connecting the linear flow paths LP to each other. For example, even when a portion of the section connecting two linear flow paths LP to each other is formed as a linear line, the portion may be included in the category of the curved flow path CP.

In addition, the cooling flow path P1 according to present example embodiment may be formed in the form of a circular pipe, and may be disposed between the first plate 81 and the second plate 85 to be fastened to each of the first plate 81 and the second plate 85. For example, the first plate 81, the second plate 85, and the cooling flow path P1 may be integrally formed, and may be formed of the same material. However, the present disclosure is not limited thereto. As long as the refrigerant is flowable, the cooling flow path P1 may be deformed into various forms as in example embodiments to be described below.

As illustrated in FIG. 3, the cooling flow path P1 according to the present example embodiment may be disposed to have a meandering shape with respect to the entire lower plate 52. However, the present disclosure is not limited thereto. For example, the battery pack 1 according to present example embodiment may be partitioned into a plurality of accommodation spaces by the partition wall members 60 and 70 and the sidewall portion 51, and thus the cooling flow path P1 may be disposed to have a meandering shape corresponding to each accommodation space (see FIG. 13). In this case, the cooling flow path P1 may be disposed to have the same or similar shape for each accommodation space.

The venting flow path P2 may be provided to discharge gas generated in a battery cell to the outside of the battery pack 1. The venting flow path P2 may be formed as a space other than the cooling flow path P1 of the above-described flow path spaces.

As the linear flow paths LP of the cooling flow path P1 are spaced apart from each other by a predetermined distance, an empty space may be formed between the linear flow paths LP. In the present example embodiment, the empty space is used as the venting flow path 2.

To this end, a gas inlet 89 through which gas generated in the battery cell introduced into the venting flow path P2 may be formed in the first plate 81.

The gas inlet 89 may be formed in the form of a through-hole in a position corresponding to that of the venting flow path P2 to be connected to the venting flow path P2, and a plurality of gas inlets 89 may be spaced apart from each other.

When gas is discharged from the battery cell or the cell stack 10, the discharged gas may be mainly discharged from a periphery of the terminal 11. Accordingly, the gas inlet 89 according to the present example embodiment may be formed along a region positioned below the terminal 11 of the battery cell or the cell stack 10 among positions corresponding to that of the venting flow path P2.

When the cell stack 10 is disposed to be excessively close to the gas inlet 89, the cell stack 10 may act as a factor preventing gas from being introduced into the gas inlet 89. Accordingly, in the battery pack 1 according to the present example embodiment, an empty, space may be formed in the periphery of the gas inlet 89. For example, the battery cell or the cell stack 10 may be spaced apart from the gas inlet 89 by a predetermined distance so as not to be in the gas inlet 89.

The gas introduced into the venting flow path P2 may need to be discharged to the outside of the battery pack 1, and thus all of the venting flow paths P2 may be connected to at least one gas outlet 86.

The gas outlet 66 may be disposed to pass through the sidewall portion 51 to be connected to the venting flow path P2. However, the present disclosure is not limited thereto. As illustrated in FIG. 3, in the present example embodiment, the cooling flow path P1 may partition the venting flow path P2 into two venting flow paths P2. Accordingly, the vent ng flow path P2 may be divided into a first venting flow path P21 and a second venting flow path P22 by the cooling flow path P1. In the present example embodiment, the first venting flow path P21 and the second venting flow path P22 may be formed as independent flow paths being not connected to each other, and may be connected to different gas outlets 86a and 86b, respectively.

More specifically, the battery pack 1 according to the present example embodiment may include two or more gas outlets 86a and 86b, and at least, one of the gas outlets 86a and 86b may be connected to each of the venting flow paths P21 and P22. For example, the first gas outlet 86a may be connected to the first venting flow path P21, and the second gas outlet 86b may be connected to the second venting flow path P22. In this case, gas introduced into the first venting flow path P21 may be discharged externally through the first gas outlet 86a, and gas introduced into the second venting flow path P22 may be discharged through the second gas outlet 86b (see arrow). However, the present disclosure is not limited thereto, and various modifications may be made as in example embodiments to be described below.

The gas outlet 86 may be maintained in a closed state, and may be opened when gas is generated in the battery pack 1. For example, the as outlet 86 may be provided with a film or a valve being opened by internal pressure of the battery pack 1.

In the battery pack 1 according to the present example embodiment configured as described above, the cooling flow path P1 and the venting flow path P2 may be formed together between the first plate 81 and the second plate 85. Accordingly, an inner space of the battery pack 1 may be efficiently used to increase energy density of the battery pack 1. In addition, the cooling flow path P1 and the venting flow path P2 may be disposed to be adjacent to each other, such that gas flowing in the venting flow path P2 may be cooled by the cooling flow path P1.

In addition, in the battery pack 1 according to the present example embodiment, the venting flow path P2 may be formed between the first plate 81 and the second plate 85, thereby minimizing contact with other cell stacks while high-temperature gas moves. Therefore, secondary damage caused by the high-temperature gas may be reduced.

The present disclosure is not limited to the above-described example embodiments, and various mod cations may be made.

Figure 5:
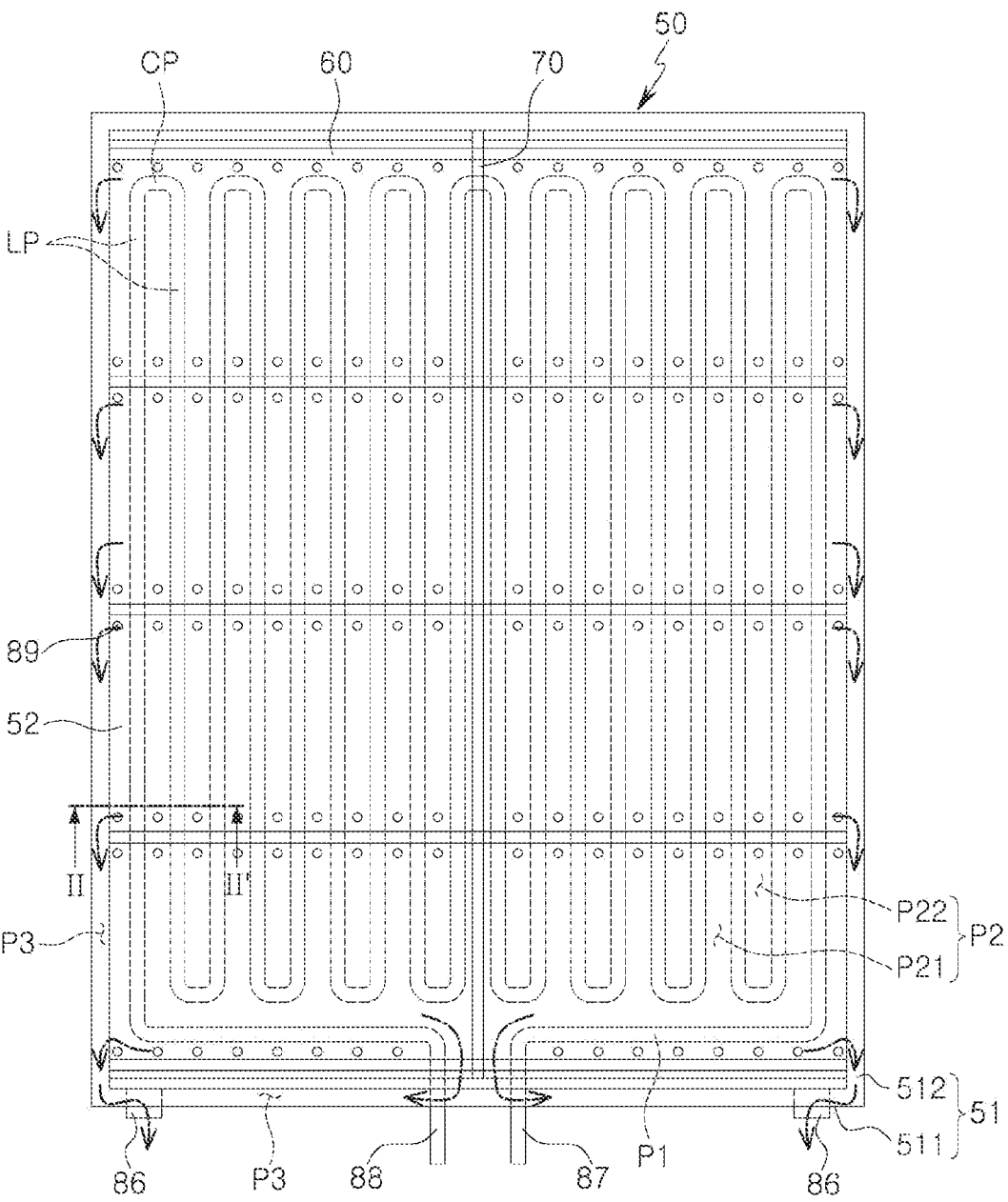
FIG. 5 is a plan view of a packing case according to another example embodiment of the present disclosure.
Figure 6:
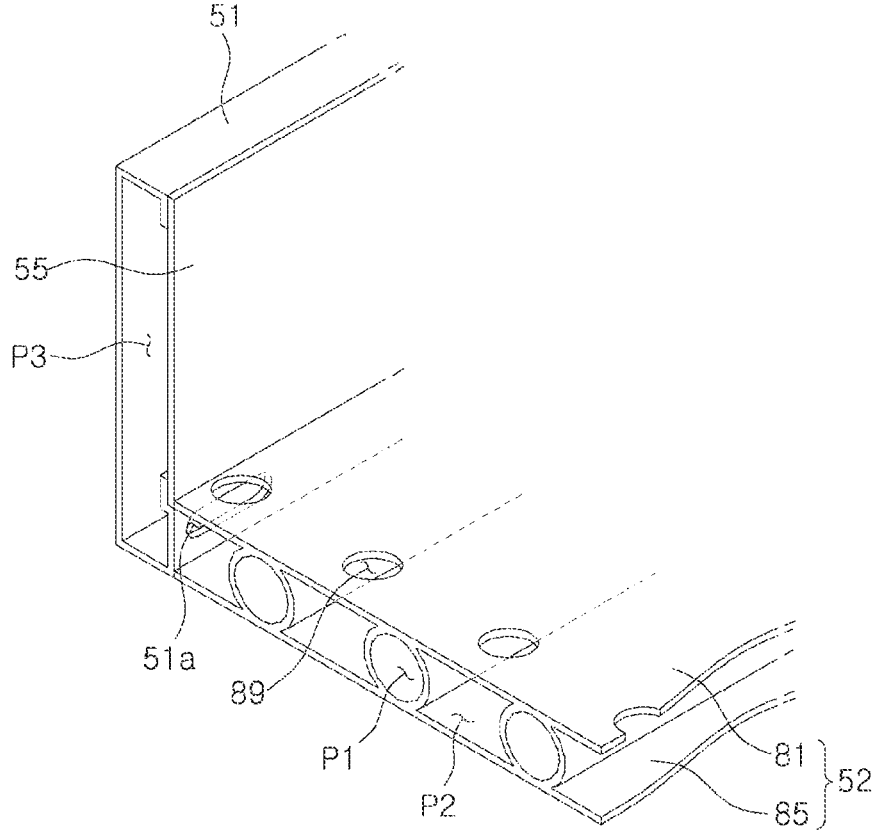
FIG. 6 is a perspective view illustrating a cross-section taken along line II-II' of FIG. 5.

FIG. 5 is a plan view of a packing case according to another example embodiment of the present disclosure, and FIG. 6 is a perspective view illustrating a cross-section taken along line of FIG. 5. In the drawings below, an arrow indicates the flow of gas introduced into a venting flow path.

Referring to FIGS. 5 and 6, in a battery pack according to the present example embodiment, an expanded flow path P3 may be provided in the sidewall portion 51.

An empty space disposed in a longitudinal direction of the sidewall portion 51 may be formed in the sidewall portion 51, and the empty space may be used as the expanded flow path P3.

The expanded flow path P3 may be connected to the venting flow path P2. For example, at least one through-hole 51a may be provided in a portion of the sidewall portion 51 disposed between the first plate 81 and the second plate 85, and gas flowing through the venting flow path P2 may be introduced into the expanded flow path P3 through the through-hole 51a to flow.

As the expanded flow path P3 is formed on the sidewall portion 51, at least one portion of the expanded flow path P3 may be disposed above the cooling flow path P1 to cross the cooling flow path P1. For example, as illustrated in FIG. 5, the expanded flow path P3 may be disposed in a form of crossing the refrigerant inlet 87 and the refrigerant outlet 88 above the refrigerant inlet 87 and the refrigerant outlet 88.

Accordingly, when the expanded flow path P3 is provided, the first venting flow path P2 and the second venting flow path P2 may be connected to each other through the expanded flow path P3. Accordingly, the battery pack according to the present example embodiment may have only one gas outlet 86. In addition, the gas outlet 86 may be disposed on the sidewall portion 51 to be connected to the expanded flow path P3. In this case, high-temperature gas introduced into the venting flow path P2 may be discharged externally through the expanded flow path P3.

When flame or high-temperature gas is generated in the battery cell, the high-temperature gas may come into contact with the partition wall members 60 and 70 or the sidewall portion 51, and accordingly, the sidewall portion 51 or the partition wall members 60 and 70 may be subjected to high heat energy. Accordingly, the packing case 50 may need to be protected from the flame or high-temperature gas, and at the same time, the flame or high-temperature gas may need to be rapidly discharged to the outside of the battery pack 1.

To this end, the sidewall portion 51 or the partition wall members 60 and 70 may have a reinforcing member 55 having a shape or structure being not deformed even at high temperature.

Hereinafter, the reinforcing member 55 will be described in more detail with reference to the sidewall portion 51. However, the reinforcing member 55 may be applied to the partition wall members 60 and 70 in the same manner.

The reinforcing member 55 may be provided in a position of the sidewall portion 51 opposing the cell stack 10.

Accordingly, the reinforcing member 55 may be first in contact with the flame or high-temperature gas emitted from the cell stack 10.

The reinforcing member 55 according to the present example embodiment may be formed of a material capable of withstanding high-temperature heat energy, and may have a structure capable of withstanding high-temperature heat energy. Accordingly, even when the gas or flame emitted from the cell stack 10 comes into contact with the reinforcing member 55 first, the sidewall portion 51 may be prevented from melting due to high-temperature heat.

To this end, the reinforcing member 55 may be formed of a material having a melting point higher than that of the sidewall portion 51. For example, when the sidewall portion 51 is formed of aluminium, the reinforcing member 55 may be formed of a material having a melting point higher than a melting point (about 660° C.) of aluminum.

In the present example embodiment, a first reinforcing member 55 may include a high heat-resistant and high fire-resistant material being melted at a temperature of 700° C. or higher. Examples of a high heat-resistant material included in the reinforcing member 55 may include, but are not limited to, an inorganic material such as iron, stainless steel, mica, or the like, and may include any material being melted at a temperature of less than 700° C.

When the reinforcing member 55 is formed of a material different from that of the sidewall portion 51, welding bonding strength therebetween may not sufficiently secured. Accordingly, the reinforcing member 55 according to the present example embodiment may be coupled to each other through a fastening member. As the fastening member, a screw, a bolt, a nut, or the like may be used, and the fastening member may pass through the sidewall portion 51 and the reinforcing member 55 in turn to fasten the sidewall portion 51 and the reinforcing member 55 to each other. However, the present disclosure is not limited thereto.

The reinforcing member 55 described above may be provided in positions of the partition wall members 60 and 70 opposing the cell stack 10. In addition, although the present example embodiment exemplifies a case in which the reinforcing member 55 is disposed only in a portion opposing the cell stack 10, the present disclosure is not limited thereto, and various modifications may be made, as necessary. For example, the entire inner wall of the expanded flow path P3 may be formed of the reinforcing member 55, thereby preventing the sidewall portion 51 from being damaged by the high-temperature gas flowing through the expanded flow path P3.

Figure 7:
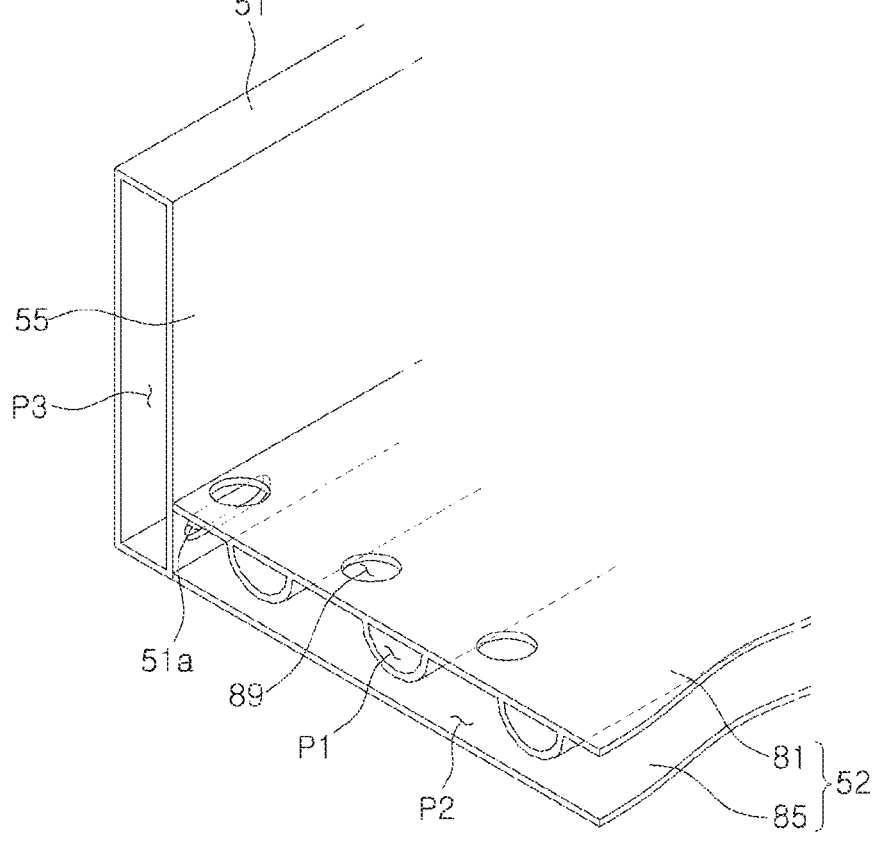
FIG. 7 is a perspective view illustrating a cross-section of a packing case according to another example embodiment of the present disclosure.

FIG. 7 it a perspective view illustrating a cross-section of a packing case according to another example embodiment of the present disclosure.

Referring to FIG. 7, in a battery pack according to the present example embodiment, the cooling flow path P1 may be formed integrally with the first plate 81, and may be spaced part from the second plate 85 by a predetermined distance. Accordingly, the entire space between the cooling flow path P1 and the second plate 85 may be used as the venting flow path P2.

In such a configuration, the entire venting flow path P2 may be connected to one flow path, such that gas flowing in the venting flow path P2 may be entirely discharged through only one gas outlet 86 even without the above-described expanded flow path P3. However, the present disclosure is not limited thereto, and it is also possible to include the above-described expanded flow path P3, as necessary.

Figure 8:
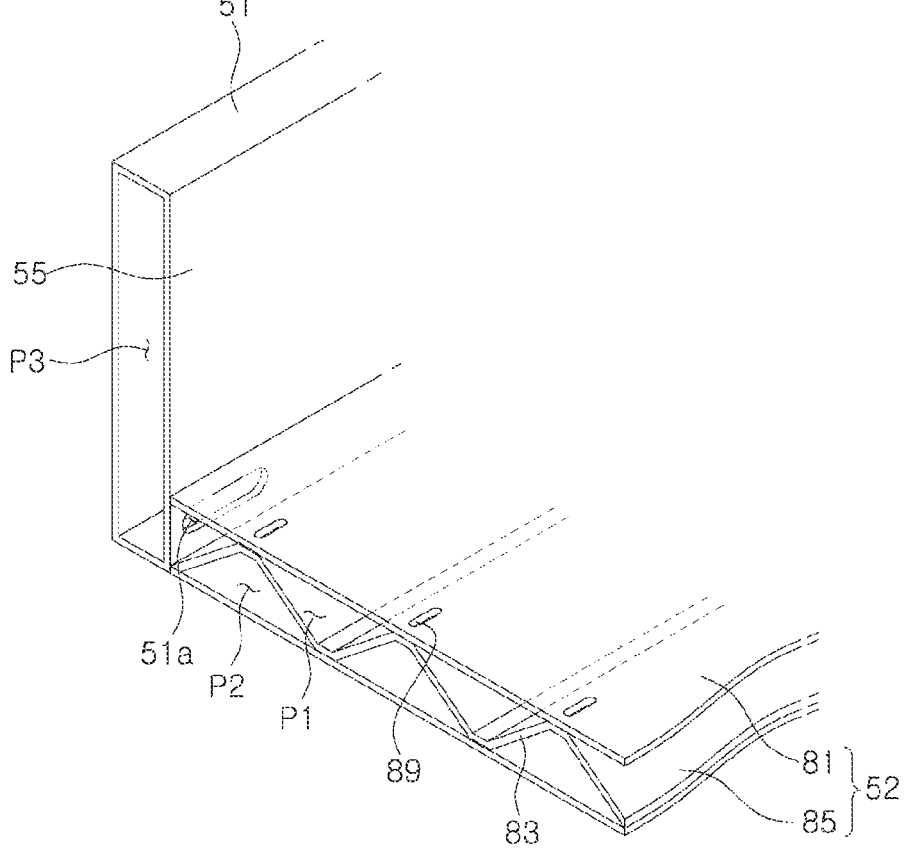
FIG. 8 is a perspective view illustrating a cross-section of a packing case according to another example embodiment of the present disclosure.

FIG. 8 is a perspective view illustrating a cross-section of a packing case according to another example embodiment of the present disclosure.

Referring to FIG. 8, the partition wall member 83 may be disposed between the first plate 81 and the second plate 85 in a flow path space according to the present example embodiment.

The partition wall member 83 may be disposed such that opposite surfaces thereof oppose the entire first plate 81 and second plate 85, and may have a cross-section having a repetitive wave shape.

In the present example embodiment, the partition wall member 83 may have a cross-section having a triangular wave (or sawtooth wave) shape. Accordingly, a cross-section of each of the cooling flow path P1 and the venting flow path P2 may have a substantially triangular shape. More specifically, the cooling flow path P1 and the venting flow path P2 may be alternately disposed in a triangular-shaped flow path repeatedly formed by the partition wall member 83, the first plate 81, and the second plate 85.

For example, the cooling flow path P1 may have one triangular side formed by the first plate 81 and the other two sides formed by the partition wall member 83, and the venting flow path P2 may have one triangular side formed by the second plate 85, and the other two sides formed by the partition wall member 83.

In this case, the first plate 81 may be mostly used as the cooling flow path P1, such that an area of the first plate 81 in contact with a refrigerant may be increased. Accordingly, cooling efficiency of the cell stack 10 may be enhanced. In addition, the transfer of heat of gas flowing in the venting flow path P2 to the first plate 81 may be minimized.

The cross-section of the partition wall member 83 is not limited to the triangular wave shape. For example, various modifications may be made, as necessary, such as the cross-section of the partition wall member 83 formed to have a quadrangular wave shape or a sine wave shape.

Figure 9:
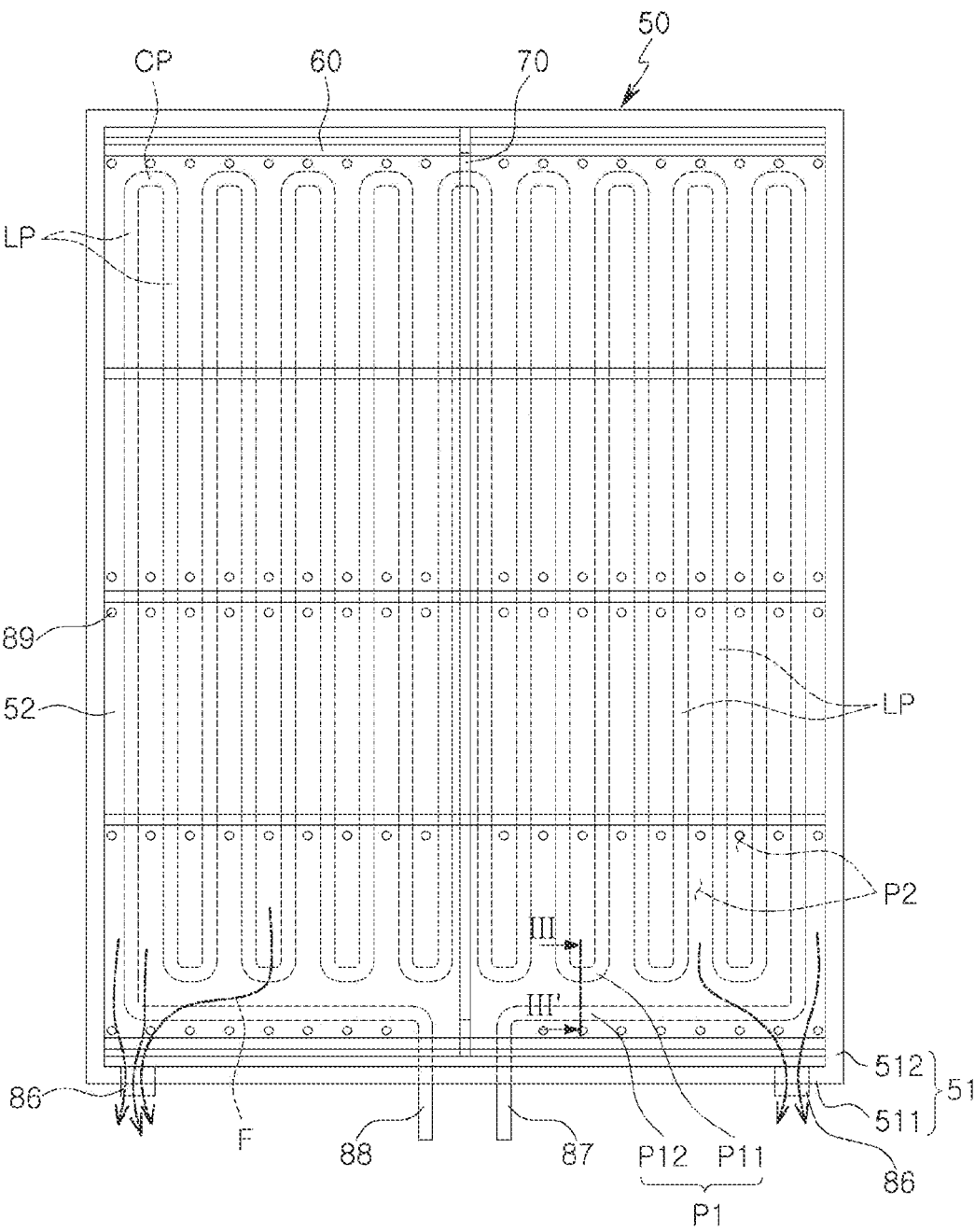
FIG. 9 is a plan view of a packing case according to another example embodiment of the present disclosure.
Figure 10A:
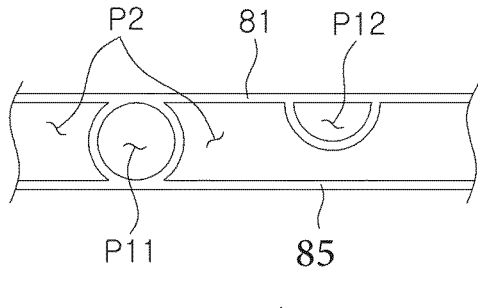
FIGS. 10A and 10B are partial cross-sectional views of FIG. 9.
Figure 10B:
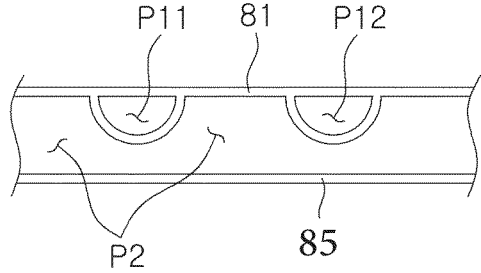

FIG. 9 is a plan view of a packing case according to another example embodiment of the present disclosure. FIGS. 10A and 10B are partial cross-sectional views of FIG. 9. Referring to FIGS. 9, 10A, and 10B, an overall shape of a cooling flow path according to the present example embodiment may be similar to that of the example embodiment illustrated in FIG. 3 or 5, and may be different from that of the example embodiment illustrated in FIG. 3 or 5 only in terms of a partial difference in thickness of the cooling flow path P1.

Specifically, as illustrated in FIG. 10A, a portion P11 (hereinafter, a first flow path) of the cooling flow path P1 may be disposed between the first plate 81 and the second plate 85 to be fastened to each of the first plate 81 and the second plate 85 as in the example embodiment illustrated in FIG. 4. A remaining portion P12 (hereinafter, a second flow path) of the cooling flow path P1 may be fastened only to the first plate 81 and may be disposed to be spaced apart from the second plate 65 by a predetermined distance as in the example embodiment illustrated in FIG. 7.

The first flow path P11 may refer to a flow path substantially disposed for cooling the lower plate 52 among the cooling flow paths P1, and may also refer to a flow path formed to have a meandering shape. In addition, the second flow path P12 may refer to a flow path connecting the refrigerant inlet 87 or the refrigerant outlet 88 and the first flow path P11 to each other among the cooling flow paths P1, and may also refer to a flow path disposed to cross between the first flow path P11 and the gas outlet 86. Accordingly, the second flow path P12 may be formed as a flow path disposed on an outermost side of the cooling flow path P1 or may be formed as a portion of the flow path.

In such a configuration, gas introduced into the venting flow path P2 formed in a region of the first flow path P11 may move toward the second flow path P12, and then may be discharged to the gas outlet 86 through a space between the second flow path P12 and the second plate 85.

In addition, the entire venting flow path 82 may be connected to one flow path, such that gas may be discharged even when only one gas outlet 86 is provided without the above-described expanded flow path P3. However, a plurality of gas outlets 86 may be provided to enhance the efficiency of gas discharge.

In the present example embodiment, the gas outlet 86 may be disposed on the first sidewall 511 of the sidewall portion 51, and the linear flow path LP may be disposed in parallel with the second sidewall 512. In this case, gas introduced into the venting flow path P2 may move toward the first sidewall 511 along the venting flow path P2 formed between the linear flow paths LP. Accordingly, the second flow path P12 may be disposed between the first sidewall 511 and the first flow path P11. Thus, a position of the second flow path P12 may be changed according to a position of the gas outlet 86 or a flow direction of the venting flow path P2.

In addition, in the present example embodiment, a case in which two gas outlets 86 are connected to the venting flow path P2 is exemplified. However, the present disclosure is not limited thereto, and various modifications may be made, as necessary, such as only one gas outlet 86 disposed in one venting flow path P2 or three or more gas outlets 86 disposed in the one venting flow path P2.

In the present example embodiment, a case in which the entire first flow path P11 is fastened to each of the first plate 81 and the second plate 85 is exemplified. However, in the same manner as the second flow path P12, a portion of the first flow path P11 may be configured to be spaced apart from the second plate 85, as necessary. For example, as illustrated in FIG. 10B, at least one portion of the curved flow path CP of the first flow path P11 disposed to be adjacent to the second flow path P12 may be configured to be spaced apart from the second plate 85. In this case, gas may move toward the second flow path P12 in a direction indicated by an arrow F, such that a movement path of the gas may be minimized. Such a configuration may be applied to all of example embodiments to be described below.

FIGS. 11 to 15 are modifications of FIG. 9, and include the first flow path P11 and the second flow path P12 described above. FIGS. 11 to 15 are different from FIG. 9 only in terms of an overall shape of the cooling flow path P1.

The cooling flow path P1 according to the above-described example embodiments may be formed as a single flow path without a branch point conversely, in packing cases to be described below, a plurality of branch points Q may be provided in the cooling flow path P1, and thus the cooling flow path P1 may be formed to have a parallel structure.

Figure 11:
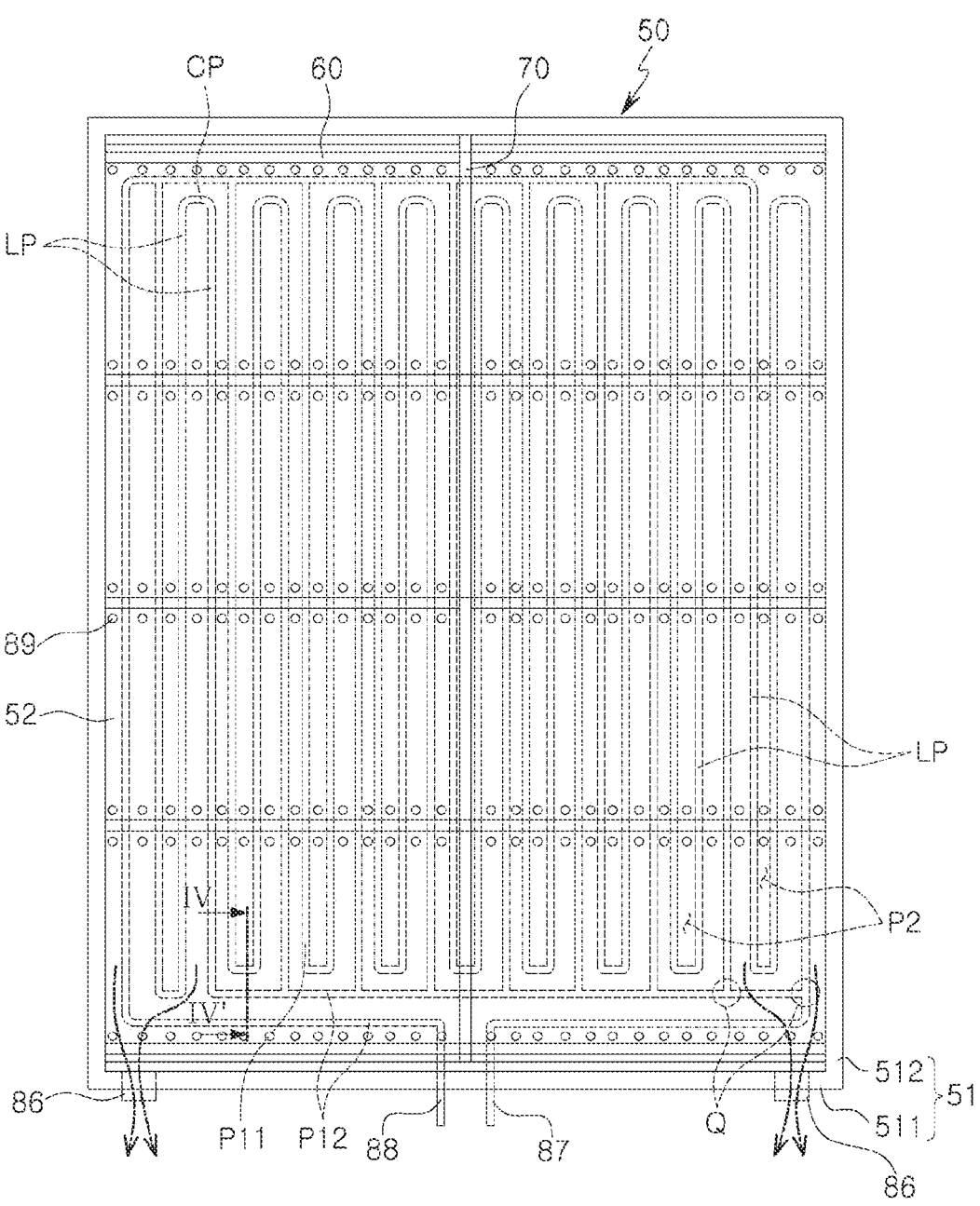
FIG. 11 is a plan view of a packing case according to another example embodiment of the present disclosure.
Figure 12:
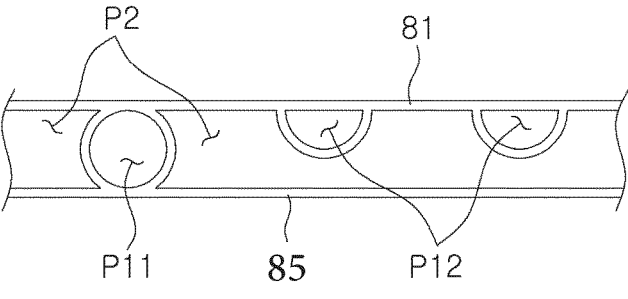
FIG. 12 is a partial cross-sectional view of FIG. 11.

FIG. 11 is a plan view of a packing case according to another example embodiment of the present disclosure, and FIG. 12 is a partial cross-sectional view of FIG. 11.

Referring to FIGS. 11 and 12, in the cooling flow path P1 according to the present example embodiment, the second flow path P12 connected to the refrigerant inlet 87 may be branched into a plurality of first flow paths P11 to be disposed to have a meandering shape in a region of an accommodation space, to be merged back into one second flow path P12, and then to be connected to the refrigerant outlet 88.

Due to such a configuration, a plurality of second flow paths P12 may be disposed in parallel in the present example embodiment.

Thus, the second flow path P12 may be deformed into various shapes depending on a shape of the cooling flow path P1. In addition, as described with reference to FIG. 10B, it is also possible to configure at least one portion of the curved flow path CP among the first flow paths P11 to be spaced apart from the second plate 85.

Figure 13:
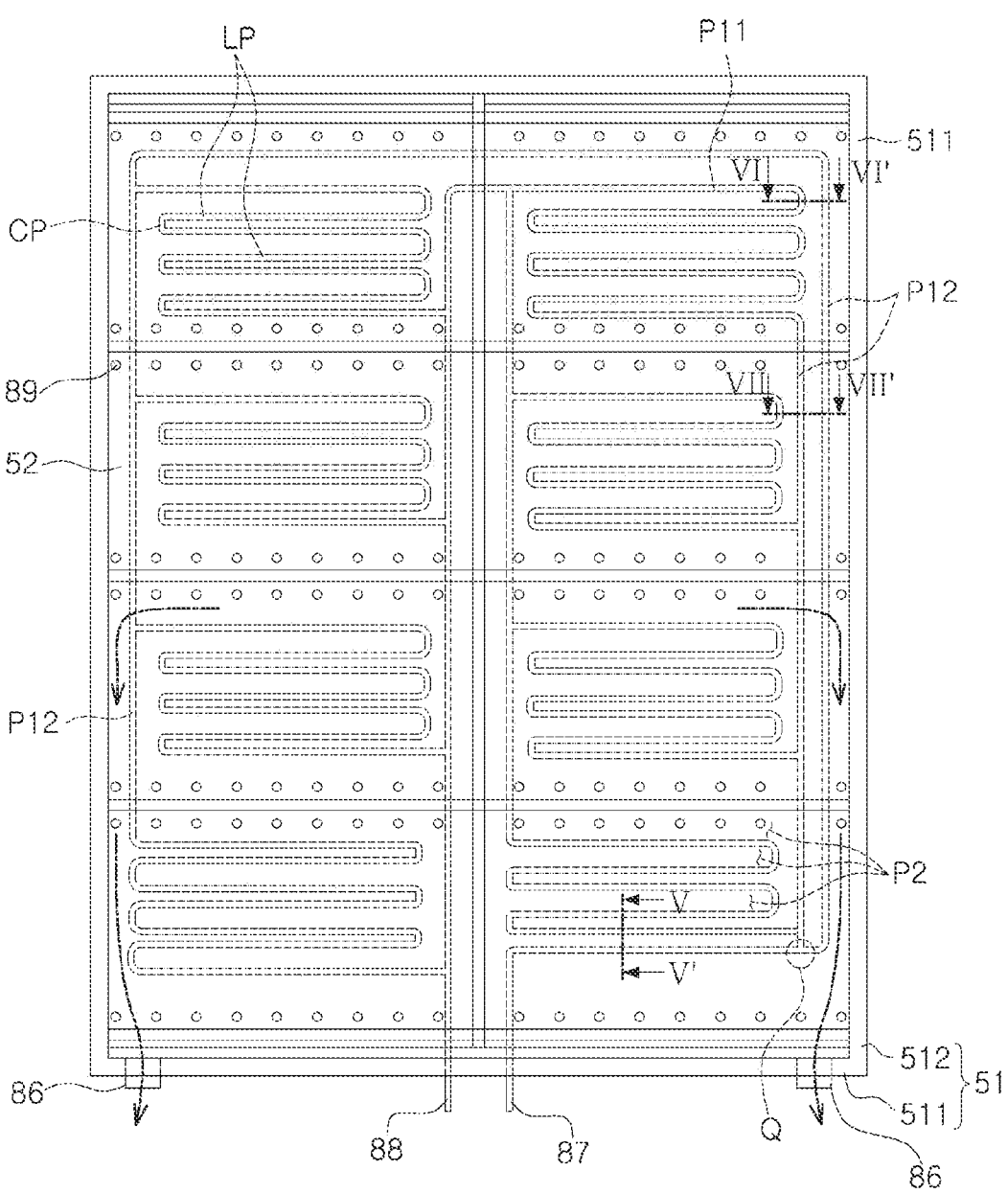
FIG. 13 is a plan view of a packing case according to another example embodiment of the present disclosure.
Figure 14A:
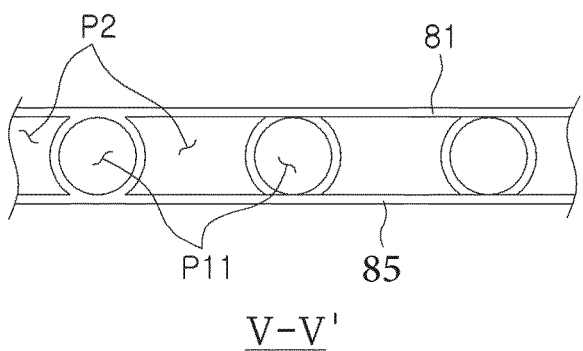
FIGS. 14A, 14B, and 14C are partial cross-sectional views of FIG. 13.
Figure 14B:
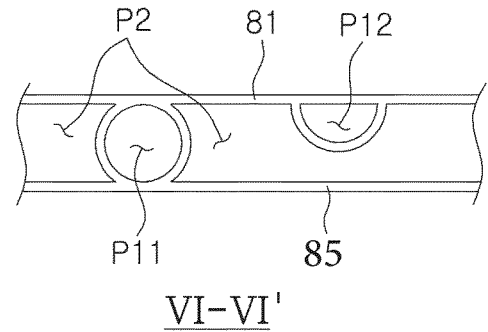
Figure 14C:
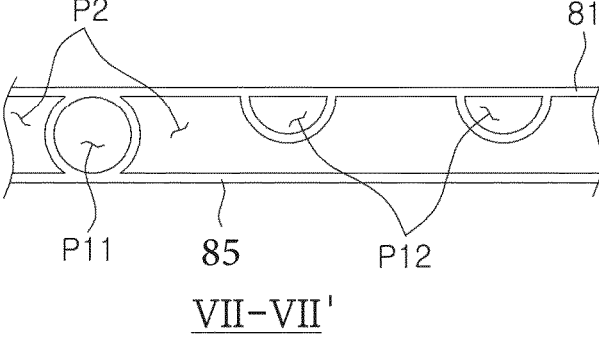

FIG. 13 is a plan view of a packing case according to another example embodiment of the present disclosure. FIGS. 14A, 14B, and 14C are partial cross-sectional views of FIG. 13.

Referring to FIGS. 13 to 14C, the cooling flow path P1 according to the present example embodiment may be branched into a plurality of flow paths respectively corresponding to accommodation spaces. That is, the branched first flow paths P11 may be disposed below the accommodation spaces, respectively.

Accordingly, in a battery pack according to the present example embodiment, the first flow paths P11 may be disposed to have shapes the same as or similar to those of the accommodation spaces, respectively.

In the cooling flow path P1 according to the present example embodiment, the linear flow path LP of the first flow path P11 may be disposed in parallel with the first sidewall 511 of the sidewall portion 51. In this case, gas may more toward the second sidewall 512 through the venting flow path P2, such that the second flow path P12 may be disposed between the second sidewall 512 and the first flow path P11 in the present example embodiment.

Figure 15:
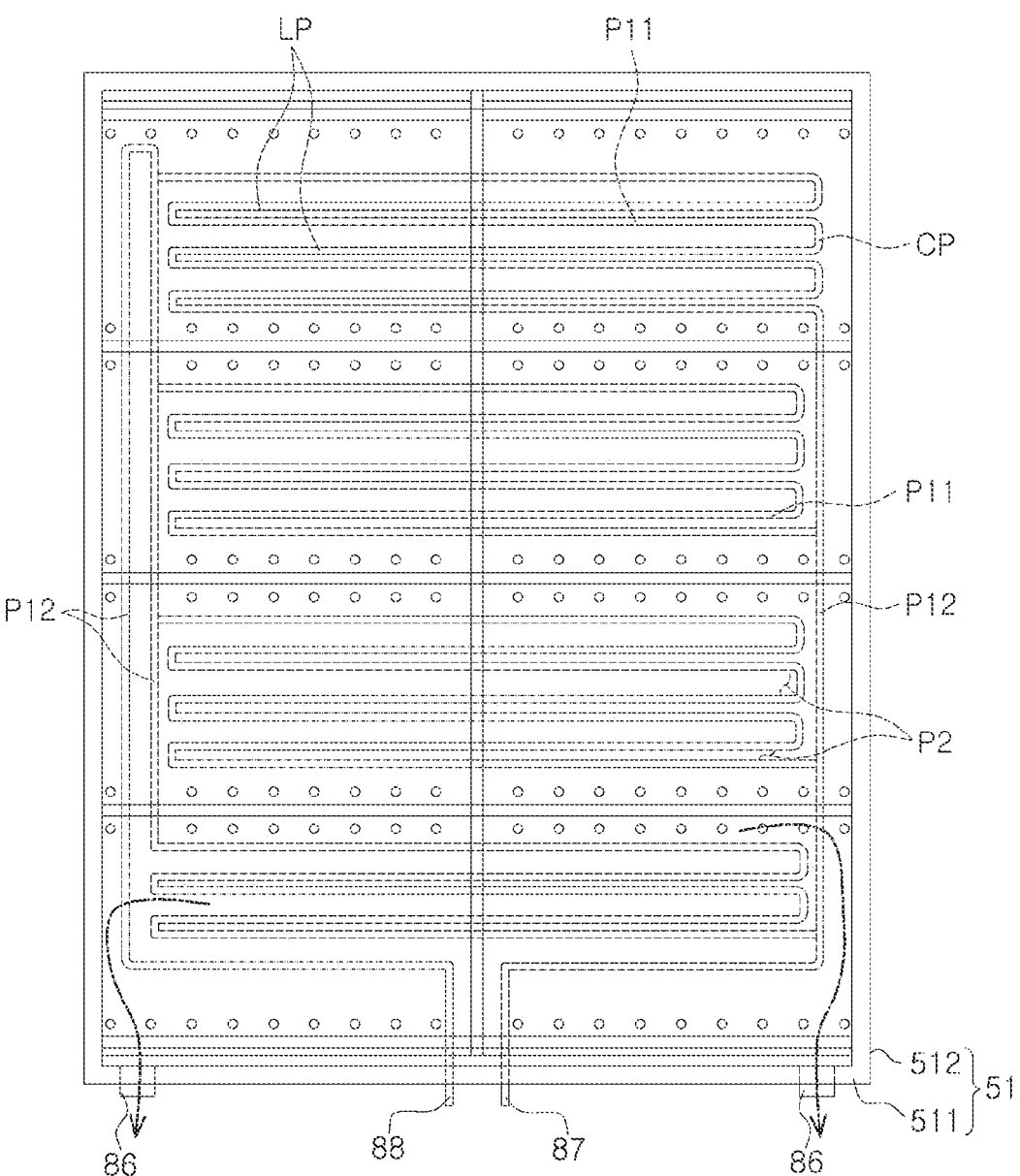
FIG. 15 is a plan view of a packing case according to another example embodiment of the present disclosure.

FIG. 15 is a plan view of a packing case according to another example embodiment of the present disclosure, and illustrates a modification of FIG. 13.

Referring to FIG. 15, the cooling flow path P1 according to the present example embodiment may be branched into a plurality of flow paths corresponding to each accommodation space. In this case, each of the branched first flow paths P11 may be disposed below two accommodation spaces.

In the cooling flow path P1 according to the present example embodiment, the linear flow path LP of the first flow path P11 may be disposed in parallel with the first sidewall 511 of the sidewall portion 51. In this case, gas may move toward the second sidewall 512 of the sidewall portion 51 through the venting flow path P2, such that the second flow path P12 may be disposed between the second sidewall 512 and the first flow path P11 in the present example embodiment.

While example embodiments have been shown and described above, it will be apparent to those skilled in the art that modifications and variations could be made without departing from the scope of the present disclosure as defined by the appended claims.

For example, the above-described example embodiments may be implemented by deleting some components therefrom, and respective example embodiments may be implemented in combination with each other.

What is claimed is:

1. A battery device comprising:
a cell stack in which a plurality of battery cells are stacked;
a cooling member cooling the cell stack;
a sidewall portion surrounding a side surface of the cell stack and coupled to the cooling member;
an expanded flow path provided in the sidewall portion; and a gas outlet coupled to the sidewall portion to be connected to the expanded flow path,
wherein the cooling member comprises:
a first plate having a gas inlet and having a first surface on which the cell stack is disposed;
a second plate spaced apart from the first plate by a predetermined distance,
at least one cooling flow path disposed on a second surface of the first plate; and
at least one venting flow path disposed on the second surface of the first plate and formed in a space between the cooling flow paths,
wherein the cooling flow path and the venting flow path are formed between the first plate and the second plate, and
wherein the gas outlet is connected to the at least one venting flow path through a side portion of the cooling member formed between the first plate and the second plate,
wherein the venting flow path is divided into a first venting flow path and a second venting flow path by the cooling flow path,
wherein the first venting flow path and the second venting flow path are formed as independent flow paths not connected to each other within the cooling member, and
wherein the first venting flow path and the second venting flow path are connected to each other through the expanded flow path.

2. The battery device of claim 1, wherein the cooling flow path is formed integrally with the first plate and the second plate.

3. The battery device of claim 1, wherein
the cooling flow path is formed integrally with the first plate, and
a space formed between the cooling flow path and the second plate is used as the venting flow path.

4. The battery device of claim 1, further comprising:
a reinforcing member coupled to a portion of the sidewall portion opposing the cell stack,
wherein the reinforcing member is formed of a material having a melting point higher than that of the sidewall portion.

5. The battery device of claim 1, wherein the cooling flow path includes:
a first flow path formed integrally with the first plate and the second plate; and
a second flow path formed integrally with the first plate, the second flow path having at least one portion spaced apart from the second plate by a predetermined distance.

6. The battery device of claim 5, wherein
the first flow path is a flow path formed to have a meandering shape, and
the second flow path is a flow path connecting the first flow path and a gas outlet to each other.

7. The battery device of claim 5, wherein the second flow path is a flow path disposed on an outermost side of the cooling flow path.

8. The battery device of claim 7, wherein
a plurality of first flow paths is dispersedly disposed, and
the second flow path is branched into a plurality of second flow paths, and the plurality of second flow paths are connected to the plurality of first flow paths, respectively.

9. The battery device of claim 1, comprising:

a first gas outlet connected to the first venting flow path; and a second gas outlet connected to the second venting flow path.

10. The battery device of claim 1, wherein the cell stack includes at least one terminal, and the gas inlet is formed in a region of the first plate positioned below the terminal.

11. The battery device of claim 1, wherein a cross-section of each of the cooling flow path and the venting flow path is formed to have a triangular shape, and the cooling flow path has one triangular side formed by the cooling flow path, and the venting flow path has one triangular side formed by the second plate.

* * * * *